Oct. 25, 1949.    R. L. LOCK    2,485,834

SCREW CLAMP CABLE COUPLING

Filed Oct. 28, 1947

INVENTOR.
Robert L. Lock
BY
*Henry L. Jennings*
Attorney

Patented Oct. 25, 1949

2,485,834

UNITED STATES PATENT OFFICE 2,485,834

SCREW CLAMP CABLE COUPLING

Robert L. Lock, Birmingham, Ala., assignor to Anderson Brass Works, a corporation of Alabama Application October 28, 1947, Serial No. 782,542

5 Claims. (Cl. 24—125)

This invention relates to a cable clamp and particularly to a clamp for electrical conductors, and has for an object the provision of a clamp which is compact occupying little space, and one which shall have improved clamping action over clamps heretofore known to me.

Further objects of my invention are to provide an improved clamp for electric conductors which shall require no special tools to install; in which the conductor is substantially totally enclosed by the clamping members; and in which the clamping members are so designed as to provide the maximum strength within a limited space.

A device embodying features of my invention is illustrated in the accompanying drawing, forming a part of this application, in which.

Figure 1:
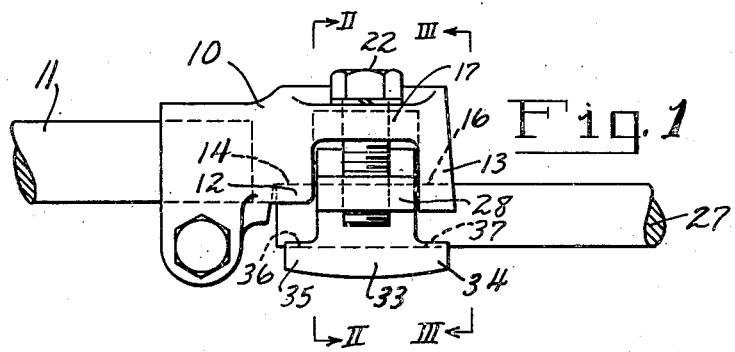
Fig. 1 is a side elevational view.
Figure 2:
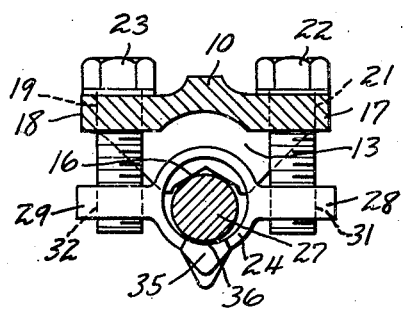
Fig. 2 is a sectional view taken along the line II—II of Fig. 1.
Figure 3:
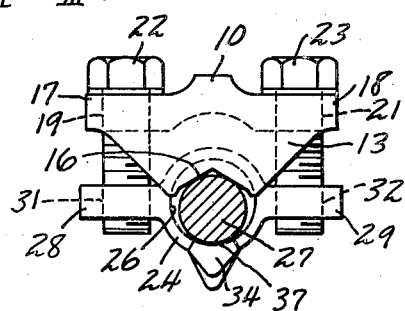
Fig. 3 is a sectional view taken along the line III—III of Fig. 1.
Figure 4:
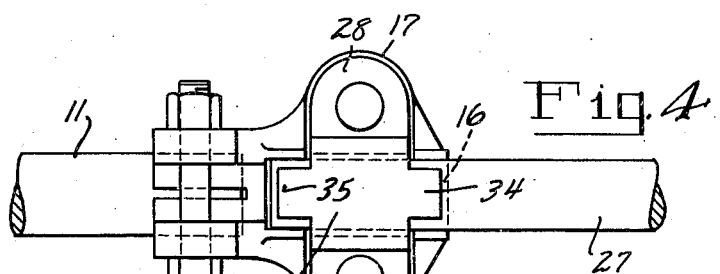
Fig. 4 is a bottom plan view of the device.

Referring to the drawing for a better understanding of my invention, my improved clamp includes a main body portion 10 secured in any suitable manner to a stud 11, or other terminal of a piece of electrical apparatus, such as a transformer, not shown. As viewed in Fig. 1 of the drawing, the body 10 is provided with downwardly projecting legs 12 and 13 forming an inverted U-shaped clamping portion. The lower ends of the legs 12 and 13 are provided with opposed seats 14 and 16 which, as illustrated herein, are hexagonal in shape, but which may be of any desired shape. Extending laterally from the body portion, intermediate the legs 12 and 13, are lugs 17 and 18. The lugs 17 and 18 are provided with unthreaded openings 19 and 21 through which extend cap screws 22 and 23.

Interposed between the legs 12 and 13 is a movable, cylindrical clamping member 24 having an opening 26 therein for receiving a conductor 27. The member 24 is provided with lateral lugs 28 and 29 having threaded openings 31 and 32 therein, opposed to the openings 19 and 21, for receiving the cap screws 22 and 23 to draw the clamping member 24 inwardly between the legs 12 and 13.

The clamping member 24 is provided with a longitudinal reinforcing rib 33 which projects at 34 and 35 beneath the seats 14 and 16 in the main body portion of the clamp. The extensions 34 and 35 are provided with seats 36 and 37 to cooperate with the seats 14 and 16 in the main body portion of the clamp.

It will be seen from the foregoing that my improved clamp provides the maximum of clamping action, within a limited space. With the well known eye bolt type of clamp, as the clamp is tightened down, the bolt is drawn farther through the body portion of the clamp, thus causing it to occupy additional space. With my improved clamp, the space occupied is the same regardless of how much the screws 22 and 23 are tightened down. It will be furthermore apparent that the conductor 27 is substantially wholly enclosed within the clamp between the clamping member 24 and the main body portion. I have thus provided the maximum of electrical contact, coupled with the maximum of clamping action within a minimum of space. Also, by making the clamping member 24 cylindrical in shape and providing it with the reinforcing rib 33, I have provided the maximum of strength therein and a positive contact between the conductor and the opposed seats.

Figure 5:
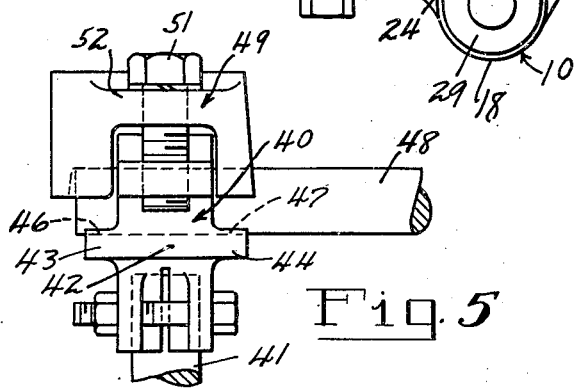
Fig. 5 is a side elevational view of a slightly modified form of clamp embodying the features of my invention.

While I have shown and described the terminal 11 connected to the body 10, it will be apparent that it might be connected to the relatively movable clamping member 24 without departing from the spirit of my invention. For example, in Fig. 5 of the drawing I show a clamp embodying a cylindrical clamping member 40, similar to the member 24, secured to a terminal 41, similar to the terminal 11 shown in Fig. 1 of the drawing. The member 40 is provided with a reinforcing rib 42 having extensions 43 and 44 provided with seats 46 and 47 for a conductor 48 which extends through the cylindrical member as shown. Cooperating with the cylindrical member 40 is a relatively movable member 49, similar in all respects to the clamping portion of the member 10 in Fig. 1. The member 49 is drawn into engagement with the conductor 48 by means of cap screws 51 passing through lugs 52 on the member 49, disposed similarly to those already described.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. A cable clamp comprising a main body having opposed legs forming a U-shaped clamping portion with spaced opposed seats, lateral lugs on the clamping portion positioned between the legs, a relatively movable clamping member having a cylindrical body portion movable between the opposed legs of the main body and having an opening therein to receive a cable, lateral lugs on the cylindrical body portion opposed to the lugs on the main body, and securing means cooperating between the opposed lugs.

2. A clamp for electrical conductors comprising a main body having opposed legs forming a U-shaped clamping portion with spaced opposed seats, lateral lugs on the clamping portion positioned between the legs, a movable clamping member having a body portion movable between the opposed legs of the main body and having a closed circular opening therethrough to receive a conductor, lateral lugs on the body, a reinforcing rib on the body portion of the clamping member extending at both ends thereof opposite the seats on the main body, and securing means connecting the opposed lugs.

3. A clamp for electrical conductors comprising a main body having opposed legs forming a U-shaped clamping portion with spaced opposed seats, lateral lugs on the clamping portion positioned between the legs, a movable clamping member having a body portion relatively movable between the opposed legs of the main body and having an opening therethrough to receive a conductor, an extension on each end of the body portion each providing a seat opposed to one of the seats in the main body, lateral opposed lugs having opposed openings therein on the main body and on the movable clamping member respectively, and securing means extending through the opposed openings to draw the clamping member toward the main body.

4. A clamp for electrical conductors comprising a main body having spaced opposed legs forming a U-shaped clamping portion, said legs having opposed seats formed in their outer ends, a relatively movable cylindrical clamping member fitting snugly between the legs of the main body and having a closed circular opening therethrough for a conductor in line with the opposed seats, a reinforcing rib on the cylindrical member extending longitudinally thereof opposite the opposed seats in the main body and having seats therein opposite the seats in the legs of the main body, lateral opposed lugs having opposed openings therein on the main body and on the cylindrical clamping member respectively, and securing means extending through the opposed openings to draw the main body and clamping member toward each other.

5. A clamp for electrical conductors comprising a main body, there being a transversely extending U-shaped groove in the body providing a pair of opposed legs outstanding from the body, seats on the ends of said legs for receiving an electrical conductor placed across said groove, laterally extending lugs on the main body at the ends of said groove, a movable member in the form of a ring disposed for movement toward the bottom of said groove between the spaced legs, laterally disposed lugs on the movable member aligned with the lugs on the main body, conductor seats on said movable member in the form of lugs projecting outwardly of the ends of said movable member and disposed to cooperate with the seats on said main body in clamping a conductor, and bolts passing through the lateral lugs of the main body and movable member for drawing the same toward each other.

ROBERT L. LOCK.

REFERENCES CITED

The following references are of record in the file of this patent:

UNITED STATES PATENTS

| Number | Name | Date |
|---|---|---|
| 195,728 | Roberts | Oct. 2, 1877 |
| 1,811,154 | Reilly | June 23, 1931 |
| 2,422,332 | Becker | June 17, 1947 |

FOREIGN PATENTS

| Number | Country | Date |
|---|---|---|
| 198,919 | Germany | June 2, 1908 |